United States Patent
Smith et al.

(10) Patent No.: US 10,041,576 B2
(45) Date of Patent: Aug. 7, 2018

(54) TORQUE CONVERTER INCLUDING COVER FLUID FLOW BAFFLES

(71) Applicant: Schaeffler Technologies AG & Co. KG, Herzogenaurach (DE)

(72) Inventors: Matthew Smith, Wooster, OH (US); Nigel Gurney, Wooster, OH (US); Jasmina Subotic, Wooster, OH (US); Markus Steinberger, Macedonia, OH (US); Daniel Sayre, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 168 days.

(21) Appl. No.: 15/097,596

(22) Filed: Apr. 13, 2016

(65) Prior Publication Data

US 2017/0299031 A1   Oct. 19, 2017

(51) Int. Cl.
 *F16D 33/18* (2006.01)
 *F16H 45/02* (2006.01)
 *F16H 41/24* (2006.01)

(52) U.S. Cl.
 CPC ............. *F16H 45/02* (2013.01); *F16D 33/18* (2013.01); *F16H 41/24* (2013.01); *F16H 2045/0215* (2013.01)

(58) Field of Classification Search
 CPC .................................. F16D 33/18; F16H 41/24
 USPC ........................................... 60/333, 361, 362
 See application file for complete search history.

(56) References Cited

U.S. PATENT DOCUMENTS

| | | | | |
|---|---|---|---|---|
| 2,910,832 | A | * 11/1959 | Kelley | F16H 41/04 60/362 |
| 4,557,357 | A | * 12/1985 | Tinholt | F16H 45/02 60/338 |
| 5,655,368 | A | * 8/1997 | Koike | F16H 45/02 60/365 |
| 8,327,636 | B2 | 12/2012 | Karamavruc et al. | |
| 8,789,669 | B2 | 7/2014 | Karamavruc et al. | |

* cited by examiner

*Primary Examiner* — Michael Leslie
(74) *Attorney, Agent, or Firm* — Davidson, Davidson & Kappel, LLC (57) ABSTRACT

A torque converter is provided. The torque converter includes a cover. The cover includes a radially extending section and an axially extending section extending axially from an outer radial end of the radially extending section. The torque converter also includes at least one baffle assembly attached to the radially extending section or the axially extending section of the cover. The at least one baffle assembly includes a plurality of baffles protruding from the cover to impact fluid flow in the torque converter. Methods of forming a torque converter are also provided.

20 Claims, 9 Drawing Sheets

TORQUE CONVERTER INCLUDING COVER FLUID FLOW BAFFLES

The present disclosure relates generally to torque converters and more specifically to the fluid flow baffles in torque converters.

BACKGROUND

U.S. Pat. No. 8,327,636 discloses a torque converter including a front cover having blades for increasing a fluid flow toward or away from a clutch pack. U.S. Pat. No. 8,789,669 discloses torque converter drive plates that include at least one protrusion for disrupting a Coriolis Effect on fluid in the torque converter.

SUMMARY OF THE INVENTION

A torque converter is provided. The torque converter includes a cover. The cover includes a radially extending section and an axially extending section extending axially from an outer radial end of the radially extending section. The torque converter also includes at least one baffle assembly attached to the radially extending section or the axially extending section of the cover. The at least one baffle assembly includes a plurality of baffles protruding from the cover to impact fluid flow in the torque converter. Methods of forming a torque converter are also provided.

A method of forming a torque converter is also provided. The method includes providing at least one baffle assembly including a base and a plurality of baffles; bending the baffles away from the base; and fixing the at least one baffle assembly to a radially extending section or an axially extending section of a cover.

Another method of forming a torque converter is also provided that includes projection a plurality of L-shaped baffles to a surface of a torque converter cover.

BRIEF DESCRIPTION OF THE DRAWINGS

The present invention is described below by reference to the following drawings, in which:

FIG. 7b shows an enlarged perspective view of one of the baffle assemblies shown in FIG. 7a;

DETAILED DESCRIPTION

The disclosure provides front cover baffles to improve response time after coast engagement in a torque converter. In some embodiments, a baffle ring is inserted radially inward relative to the cover and includes lanced windows (opening radially outward and/or inward) for improved fluid flow. The baffle ring may be manufactured from a strip and connected by weld, tabs, or formed into ring seamlessly. The ring may be attached to the cover by various methods: using slots in cover; retained by staking of the cover; or retained by attaching into the impeller rim closure weld area. In other embodiments, baffle rings may be attached to the pump or rear cover of the torque converter. The baffle ring eliminates the need for welding individual baffle means to the cover as in previous proposed. In other embodiments, individual L-shaped baffle assemblies may be welded to the cover.

Figure 1:
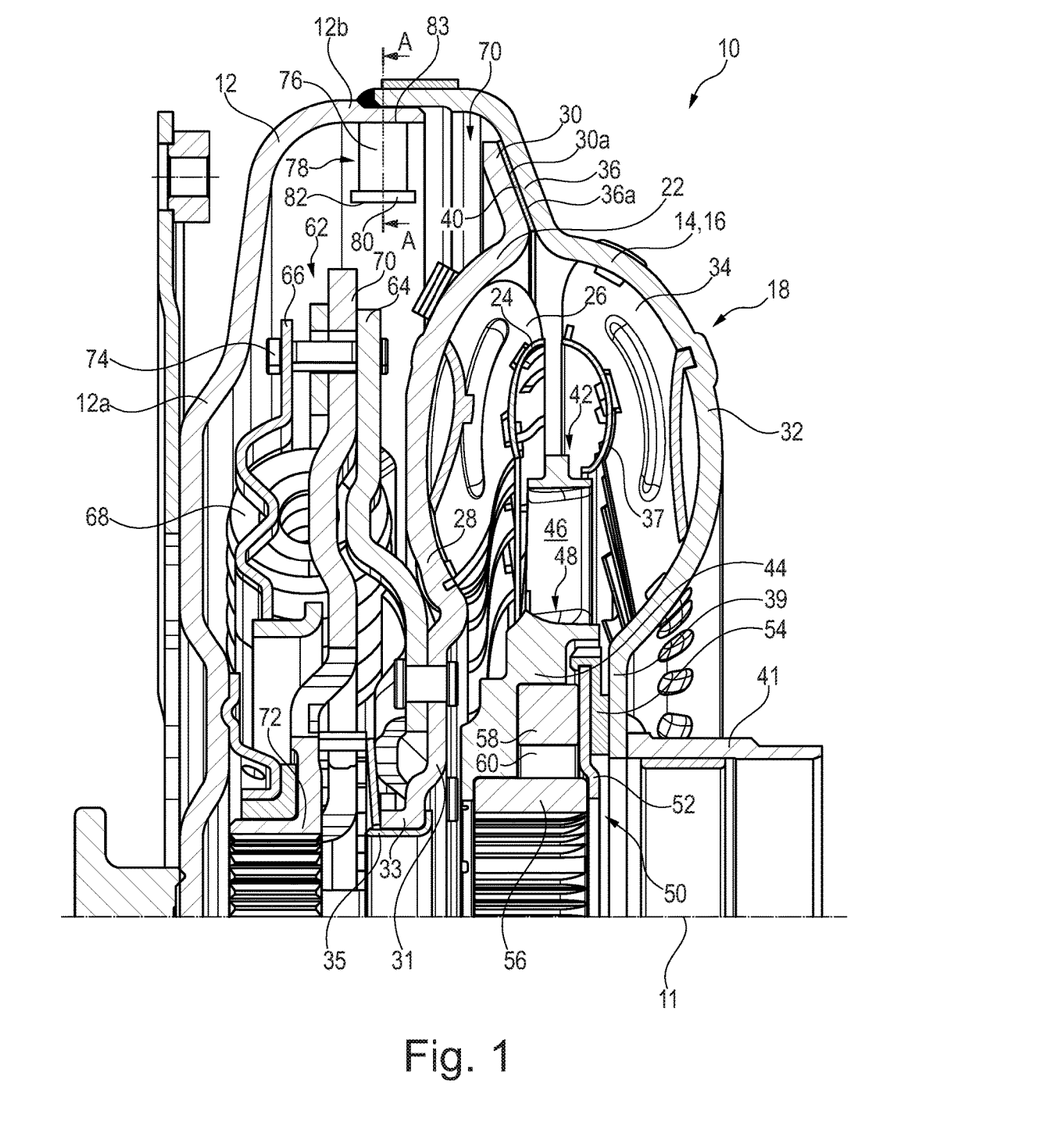
FIG. 1 shows a cross-sectional side view of a torque converter including a baffle ring according to a first embodiment of the present invention.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Front cover 12 is substantially cup-shaped and includes a radially extending plate section 12a that intersects and extends radially away from center axis 11 and an annular axially extending section 12b that protrudes axially at an outer circumference of plate section 12a. Torque converter 10 also includes a turbine 20 configured to define a piston that is axially moveable toward and away from impeller 18 to engage and disengage an impeller clutch of impeller 18 so as to form a lockup clutch. Turbine 20 includes a turbine shell 22 and a core ring 24 supporting a plurality of turbine blades 26 therebetween.

Turbine shell 22 includes a rounded blade supporting portion 28, which is shaped as an annular bowl, for contacting engine side edges of turbine blades 26. Radially outside of blade supporting portion 28, an outer radial extension 30, which forms the piston, radially protrudes outwardly from an outer circumference of blade supporting portion 28 to define an annular protrusion having a flat annular radially extending impeller facing surface 30a and having an outermost circumference that defines an outermost circumference of turbine 20. Accordingly, the piston and turbine shell 22 are formed as a single piece. Radially inside of blade supporting portion 28, turbine shell 22 includes an annular inner radial extension 31 that, at an inner radial end thereof, joins an axially extending inner circumferential section 33, whose inner circumferential surface contacts an outer circumferential surface of a hub 35.

Impeller 18 includes impeller blades 34, which are each fixed at a transmission side thereof to impeller shell 16 and are each fixed to an impeller core ring 37 at an engine side thereof by tabs. Impeller shell 16 includes a rounded blade supporting portion 32, which is shaped as an annular bowl, for contacting transmission side edges of impeller blades 34. Radially outside of blade supporting portion 32, a radially extending wall 36, which forms an impeller clutch, radially protrudes outwardly from an outer circumference of rounded blade supporting portion 32 to define an annular wall having a flat annular radially extending turbine facing surface 36a. Accordingly, the impeller clutch and impeller shell 16 are formed as a single piece. Radially inside of blade supporting portion 32, impeller shell 16 includes an annular inner radial extension 39 extending radially inward from blade supporting portion 32. A radially inner end of extension 39 is connected to an impeller hub 41.

A friction material 40 is bonded onto radially extending impeller facing surface 30a of outer radial extension 30 for engaging radially extending wall 36. In other embodiments, instead of or in addition to being bonded to outer radial extension 30, friction material 40 may be bonded to radially extending turbine facing surface 36a of radially extending wall 36. Regardless of whether friction material 40 is bonded to outer radial extension 30 or radially extending wall 36, friction material 40 is provided axially between surfaces 30a, 36a.

Torque converter 10 also includes a stator 42 axially between turbine 20 and impeller 18 to redirect fluid flowing from the turbine blades 26 before the fluid reaches impeller 18 to increase the efficiency of torque converter 10. Stator 42 includes stator casting 44 including a plurality of blades 46 and a stator body 48. Stator 42 also includes a one-way clutch 50 held within stator body 48 by a centering plate 52. An axial thrust washer 54, which is axially between stator 42 and impeller 18, is fixed to stator 42 at an outer circumference of centering plate 52. One-way clutch 50 includes an inner race 56, an outer race 58 and rollers and springs 60 radially between inner race 56 and outer race 58. Stator casting 44 is rotationally fixed to outer race 58, and depending on the operating conditions of torque converter 10, inner race 56 and outer race 58 are rotationally fixed to each other or rotatable relative to each other.

A damper assembly 62 is positioned between front cover 12 and turbine 20 and is configured for transferring torque from turbine 20 to a transmission input shaft. Damper assembly 62 includes two cover plates—a turbine side cover plate 64, which is riveted to turbine 20, and a front cover side cover plate 66. Cover plates 64, 66 support a set of arc springs 68 axially therebetween. Damper assembly 62 also includes a drive flange 70 positioned axially between cover plate 64, 66. Drive flange 70 includes an inner radial hub 72 configured for nonrotatably connecting to a transmission input shaft. Drive flange 70 further includes circumferentially extending slots for receiving springs 68. Radially outside of springs 68, cover plates 64, 66 are fixed together by a plurality of circumferentially spaced rivets 74.

In accordance with an embodiment of the invention, torque converter 10 is provided with a plurality of circumferentially spaced baffles 76 connected to front cover 12. More specifically, baffles 76 are part of a baffle assembly in the form of a baffle ring 78 that extends continuously about center axis 11. Baffle ring 78 includes an annular base 80 defining an inner circumferential surface 82 thereof. In this embodiment, baffles 76 extend radially outward from annular base 80 to connect with an inner circumferential surface 83 of axially extending section 12b of front cover 12.

Figure 2:
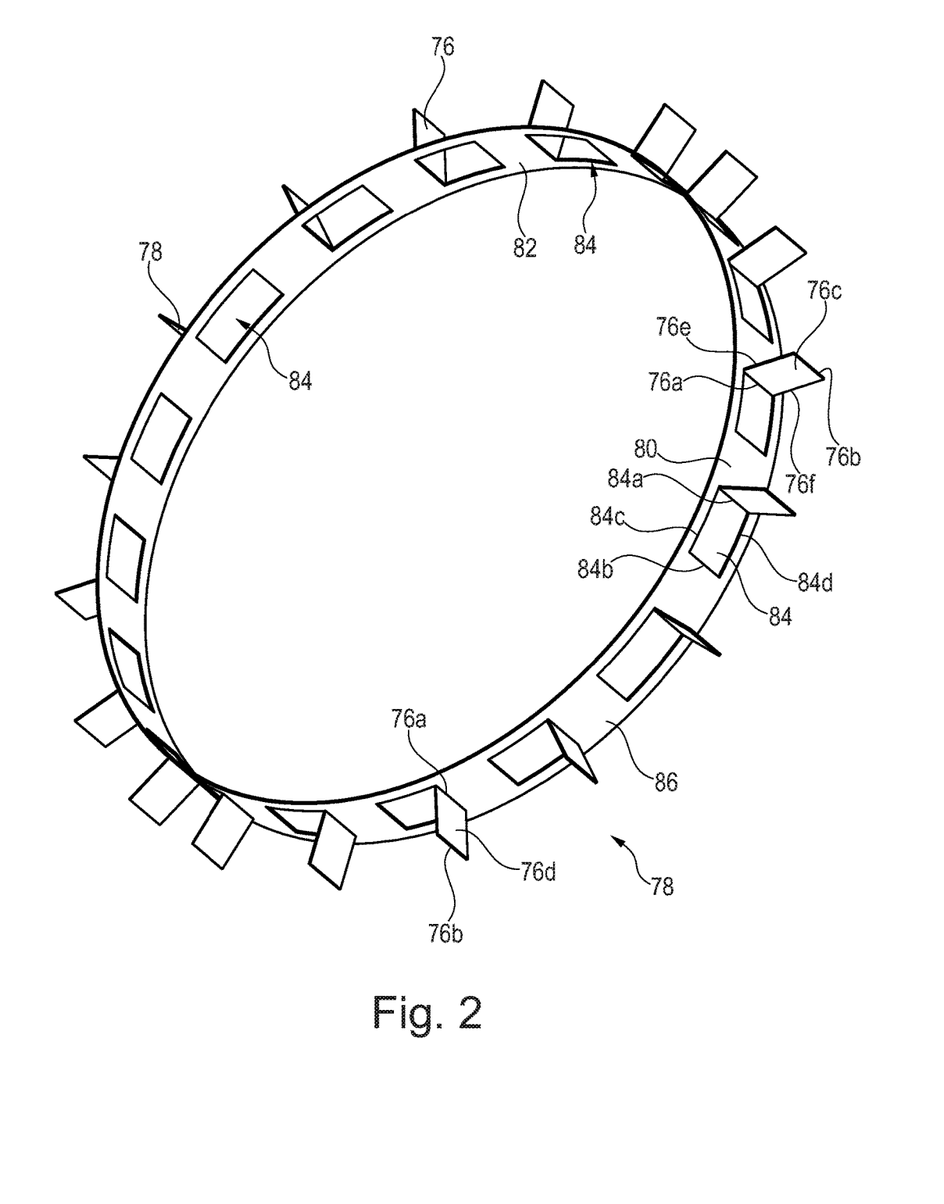
FIG. 2 shows a perspective view of the baffle ring shown in FIG. 1.

FIG. 2 shows a perspective view of baffle ring 78. As shown in FIG. 2, baffles 76 are rectangular in shape and protrude radially outward. Baffles 76 are formed by lancing annular base 80 and folding baffle 76 away from annular base 80, resulting in the formation of rectangular windows 84 in annular base 80. Windows 84 extend from inner circumferential surface 82 of annular base 80 to an outer circumferential surface 86 of annular base 80. Windows each include two axially extending edges 84a, 84b and two circumferentially extending edges 84c, 84d. Each baffle 76 extends radially outward from the first axially extending edge 84a of the corresponding window 84. Each baffle 76 includes a radially inner base edge 76a that is coincident with edge 84a and a radially outer free edge 76b that defines a radially outermost edge of baffle ring 78. Radially extending circumferentially facing planar surfaces 76c, 76d and radially extending axially facing edges 76e, 76f thereof extend radially outward from base edge 76a to free edge 76b. Baffle ring 78 may be made from strip whose edges are connected together by welding, tabs, or another attachment method, of baffle ring 78 may be formed into ring shape seamlessly.

Figure 3:
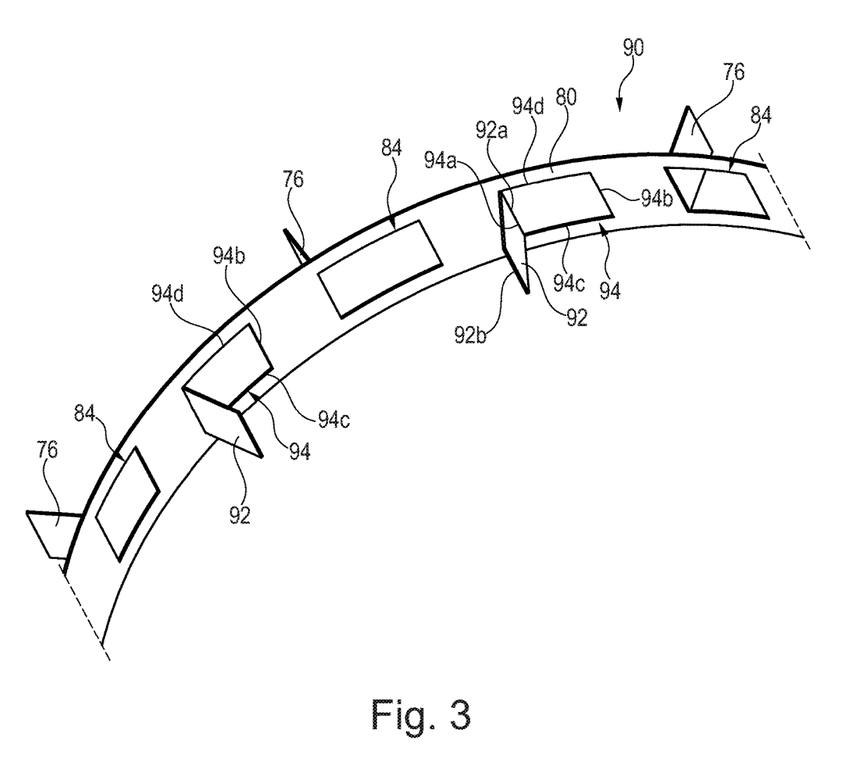
FIG. 3 shows an embodiment of a baffle ring in accordance with a second embodiment of the present invention.

FIG. 3 shows an embodiment of a baffle ring 90 in accordance with another embodiment of the present invention. Baffle ring 90 is formed in the same manner as baffle ring 78 except that in addition to radially outwardly extending baffles 76, baffle ring 90 also includes a plurality of radially inwardly extending baffles 92. In this embodiment, baffles 76 and 92 are formed in circumferentially alternating manner, with each baffle 76 being directly circumferentially between two baffles 92 and each baffle 92 being directly circumferentially between two baffles 76. Like baffles 76, baffles 92 are formed by lancing annular base 80 and folding baffle 92 away from annular base 80 in the direction opposite of baffles 76, resulting in the formation of rectangular windows 94 in annular base 80. Windows 94 extend from inner circumferential surface 82 of annular base 80 to outer circumferential surface 86 of annular base 80 and windows each include two axially extending edges 94a, 94b and two circumferentially extending edges 94c, 94d. Each baffle 92 extends radially inward from the first axially extending edge 94a of the corresponding window 94. Each baffle 92 includes a radially outer base edge 92a that is coincident with edge 94a and a radially outer free edge 92b that defines a radially outermost edge of baffle ring 90.

Figure 4A:
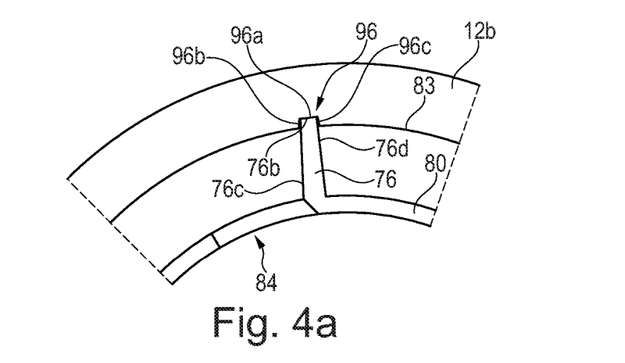
FIGS. 4a to 4c illustrate methods of connecting of the baffle ring of FIGS. 1 and 2 to the torque converter front cover.
Figure 4B:
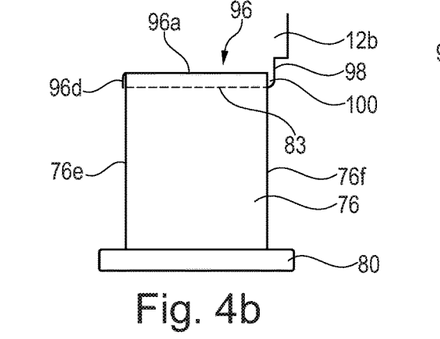

FIGS. 4a and 4b illustrate a method of connecting baffles 76 to axially extending section 12b of front cover 12 in accordance with an embodiment of the present invention. FIG. 4a illustrates an enlarged view along the cross-section shown in FIG. 1 and FIG. 4b illustrates a view shown along A-A in FIG. 1. FIGS. 4a and 4b illustrate the free edge 76b of one of the baffles 76 inserted into a circumferentially extending slot 96 formed in inner circumferential surface 83 of axially extending section 12b of front cover 12. Slot 96 includes an axially extending base wall 96a, axially and radially extending walls 96b, 96c that extend radially inward from base wall 96a and stop wall 96d joining axial edges of walls 96a, 96b, 96c. Base wall 96a contacts free edge 76b, circumferential facing edges 96b, 96c contact radially outer portions of planar surfaces 76a, 76d, respectively, and stop wall contacts edge 76e to hold baffle 76 in place. Slots 96 may be formed into the cover stamping or machining. After baffle 76 is slid into place in slot 96 such that edge 76e contacts stop wall 96d, a radially extending axially facing edge 98 of axially extending section 12b of front cover 12 is staked such that a portion of axially extending section 12b of protrudes radially inward to form a retaining protrusion 100 that contacts edge 76f of baffle 76 to hold free edge 76b of baffle 76 in place in slot 96.

Figure 4C:
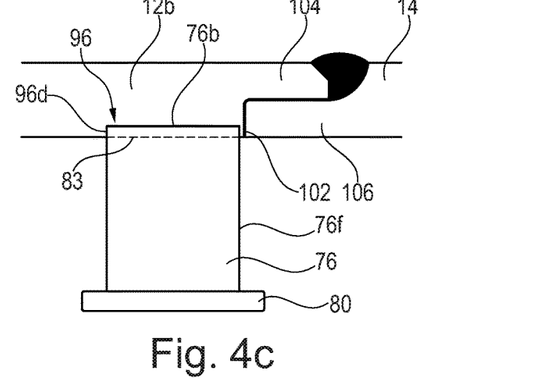

FIG. 4c illustrates a method of connecting baffles 76 to axially extending section 12b of front cover 12 in accordance with another embodiment of the present invention. FIG. 4c illustrates an enlarged view along the cross-section shown in FIGS. 1 and 4c. In this embodiment, instead of baffles 76 being axially retained in slots 96 by a staked retaining protrusion 100, baffles 76 are axially retained in slots 96 by an axial facing radially extending surface 102 of rear cover 14. As shown in FIG. 4c, in this embodiment axially extending section 12b of front cover 12 includes a thinned annular section 104 that is aligned with a thinned annular section 106 of rear cover 14, with section 106 being radially inside of section 104. Section 106 is positioned within section 104 such that surface 102 of rear cover 14 is arranged to contact edge 76f and section 104 is welded to rear cover 14 to hold free edge 76b of baffle 76 in place in slot 96.

Figure 5:
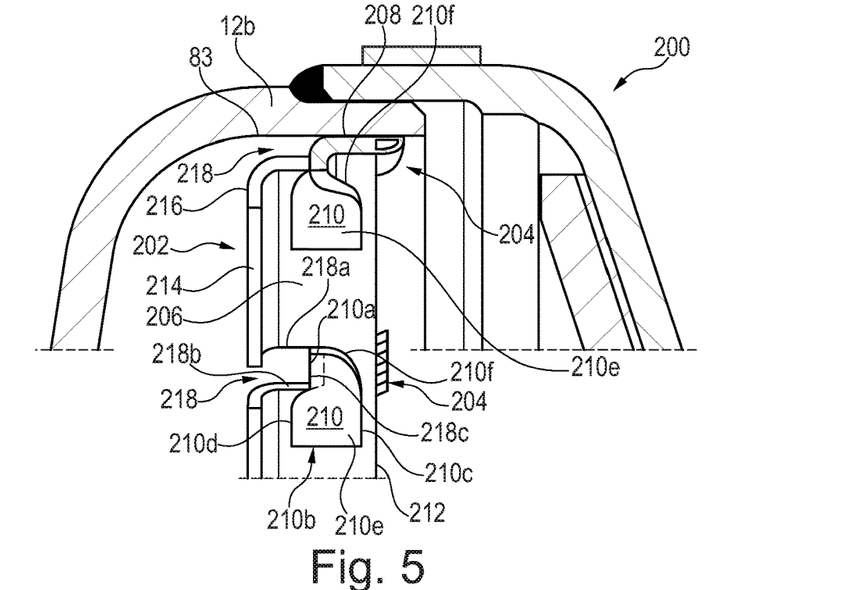
FIG. 5 illustrates a cross-sectional side view of a portion of a torque converter including a baffle assembly in accordance with third embodiment of the present invention.

FIG. 5 illustrates a cross-sectional side view of a portion of a torque converter 200 including a baffle assembly 202 in accordance with another embodiment of the present invention. In this embodiment, the baffle assembly is formed as a baffle ring 202 is fixed to inner circumferential surface 83 by a plurality of circumferentially spaced stitch welds 204. Baffle ring 202 includes an annular base 206 including an outer circumferential surface 208 that forms an outermost circumference of baffle ring 202. Baffles 210 protrude radially inward from annular base 206. Outer circumferential surface 208 rests flush against inner circumferential surface 83 of front cover section 12b and a first axial facing circumferentially and radially extending edge 212 of annular base 206 is adhered to welds 204, which are also adhered to inner circumferential surface 83. An inwardly radially extending lip 214 extending radially inward at a second axial facing circumferentially and radially extending edge 216 of annular base 206. Between edges 212, 216, baffles 210 are formed from annular base 206 in the form of twisted vanes that protrude radially inward like fingers, leaving slots 218 in annular base 206. Slots 218 include two axially extending edges 218a, 218b extending axially from edge 216 to a third circumferentially extending edge 218c. Baffles 210 are bent radially inward and each includes a circumferentially extending base edge 210a that is coincident with edge 218c and a radially inner free edge 210b that defines a radially innermost edge of baffle ring 202. Baffles 210 are each twisted between base edge 210a and free edge 210b such that a first side edge 210c of baffle 210 begins at axially extending edge 218a and then extends radially inward in a twisted path into free edge 210b and second side edge 210c begins at axially extending edge 218b and then extends radially inward in a twisted path into free edge 210b. Planar faces 210e, 210f, which both extend between side edges 210c, 210d, also follow a twisted path between base edge 210a and free edge 210b. In a preferred embodiment, ring 202 is stamped as a cylinder including both baffles 210 and base 206 with cuts that define the edges of baffles 210, then baffles 210 are bent radially inward away from base 206.

Figure 6:
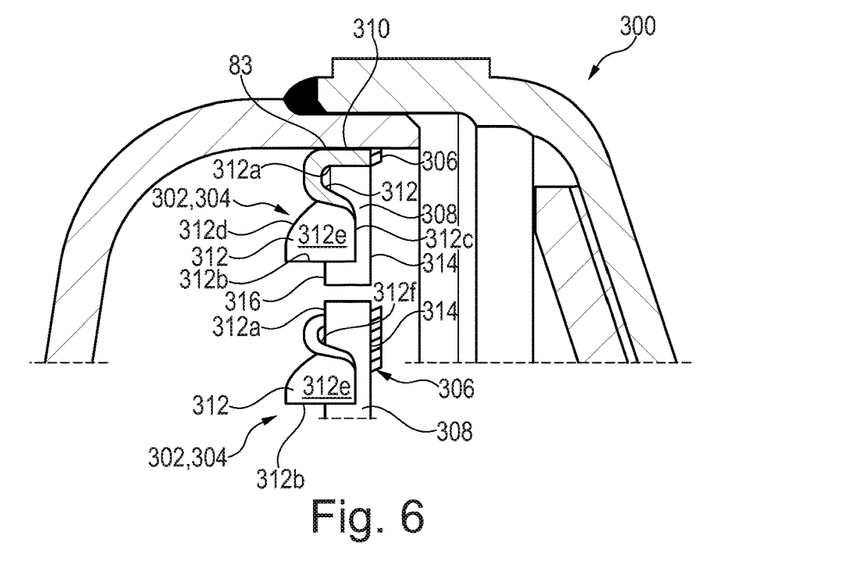
FIG. 6 illustrates a cross-sectional side view of a portion of a torque converter including baffle assemblies in accordance with a fourth embodiment of the present invention.

FIG. 6 illustrates a cross-sectional side view of a portion of a torque converter 300 including baffle assemblies 302 in accordance with another embodiment of the present invention. In this embodiment, baffle assemblies 302 form as broken ring and each baffle assembly is in the form a strip 304. Similar to baffle ring 202, strips 304 are each fixed to inner circumferential surface 83 by at least one stitch weld 306. Each baffle strip 304 includes a base strip 308 including an outer circumferential surface 310 that forms an outermost circumference of baffle assemblies 302. Baffles 312 protrude radially inward from base strips 308. Outer circumferential surface 310 rests flush against inner circumferential surface 83 of front cover section 12b and a first axial facing circumferentially and radially extending edge 314 of base strip 308 is adhered to welds 306, which are also adhered to inner circumferential surface 83. Baffles 312 extend from a second axial facing circumferentially and radially extending edge 316 of base strip 308.

Baffle assembly 302 includes baffles 306 formed in a similar manner as baffles 210 in FIG. 5 as twisted vanes that protrude radially inward like fingers, but baffles 306 are not formed out of annular base 308 to leave slots. Annular base 308 is axially thinner than annular base 206 shown in FIG. 5 and baffles 312 extend radially inward at second edge 316. Baffles 312 are bent radially inward and each includes a circumferentially extending base edge 312a that is coincident with edge 316 and a radially inner free edge 312b that defines a radially innermost edge of baffle assembly 302. Baffles 312 are each twisted between base edge 312a and free edge 312b such that first and second side edges 312c, 312d of baffle 312 begin at base edge 312a and then extend radially inward in a twisted path into free edge 312b. Planar faces 312e, 312f, which both extend between side edges 312c, 312d, also follow a twisted path between base edge 312a and free edge 312b. In a preferred embodiment, the strips are stamped to include base strip 308 and baffles 312 in single plane, then baffles 312 are bent radially inward away from base strip 308. Strips 304 are then stitched welded to front cover 12 to form a baffle ring in-situ.

Figure 7A:
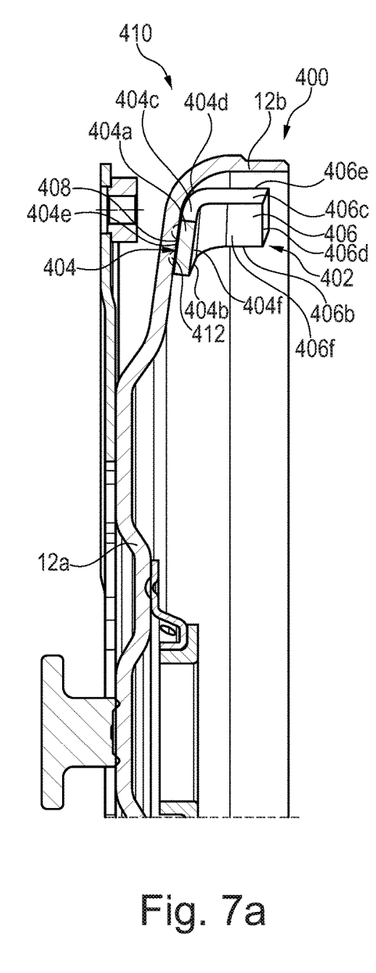
FIG. 7a illustrates a cross-sectional side view of a portion of a torque converter including baffle assemblies in accordance with a fifth embodiment of the present invention.
Figure 7B:
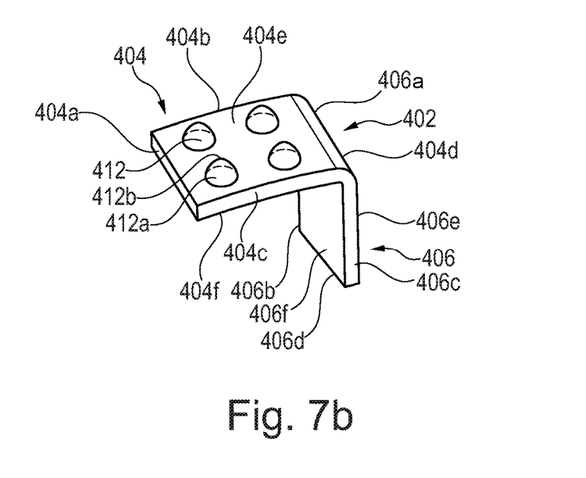

FIG. 7a illustrates a cross-sectional side view of a portion of a torque converter 400 including baffle assemblies 402 circumferential spaced from each other in accordance with another embodiment of the present invention. FIG. 7b shows an enlarged perspective view of one baffle assembly 402. Each baffle assembly 402 is formed to have an L-shape and includes a base 404 and a baffle 406 protruding from base 404. Base 404 is fixed to an axial facing radially extending surface 408 of radially extending plate section 12a of front cover 12 near a radially outer end 410 of front cover section 12a. Base 404 is provided with projections 412 at an axial facing radially extending surface 404e thereof for projection welding baffle assembly 402 to radially extending surface 408.

Base 404 is rectangular in shape and includes four side edges 404a to 404d and two planar surfaces 404e, 404f. In this embodiment, taken from a view facing surface 408, radially inner side edge 404b and radially outer side edge 404c both extend clockwise circumferentially from first later side edge 404a to second lateral side edge 404d. In this embodiment, baffle assembly 402 is angled such that as side edges 404b, 404c extend circumferentially clockwise, edges 404b, 404c also extend slightly radially outward to a lesser degree than edges 404b, 404c extend circumferentially. In other embodiments, baffle assembly 402 may not be angled and may simply extend tangentially. Also due to this angling, as lateral side edges 404a, 404d extend radially outward, edges 404a, 404d extend slightly circumferentially in the counterclockwise direction to a lesser degree than edges 404a, 404d extend radially.

In this embodiment, as shown in FIG. 7b, projections 412 are provided on planar surface 404e in the formed of oval protrusions that are conical in shape. Accordingly, projections 412 have an oval base 412a that sits on planar surface 404 and projections extend away from base 404e to a tip 412b of the cone. In other embodiments, the projections may have an oval base and be substantially spherical in shape. Projections 412 are heated to weld baffle assembly 402 to front cover surface 408. Baffle 406 extends from base 404 at planar surface 404f at an angle that is approximately perpendicular to planar surface 404f. Similar to base 404, baffle 406 is rectangular in shape and includes four side edges 406a to 406d and two planar surfaces 406e, 406f. Planar surface 406e is contiguous with planar surface 404e and planar surface 406f is contiguous with planar surface 404f. Side edge 406a forms a base side edge that this coincident with side edge 404d and side edge 406d forms a free side edge than is axially furthest away from front cover surface 408, with radially inner and outer side edges 406b, 406c and planar surfaces 406e, 406e extending from base side edge 406a to free side edge 406d. In this embodiment, taken from a view facing surface 408, as planar surfaces 406e, 406f both extend radially outward from radially inner side edge 406b to radially outer side edge 406c, surface 406e, 406f extend slightly circumferentially in the counterclockwise direction to a lesser degree than edges 406b, 406c extend radially.

Figure 7C:
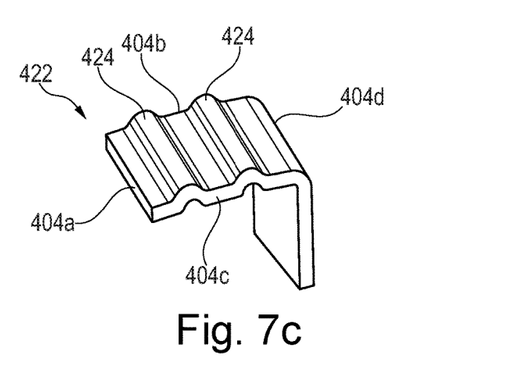
FIG. 7c shows an enlarged perspective view of a baffle assembly in accordance with another embodiment of the invention that may be used in place of the baffle assembly shown in FIG. 7b.

FIG. 7c shows an enlarged perspective view of a baffle assembly 422 in accordance with another embodiment of the present invention that may be used in torque converter 400 in place of baffle assemblies 402. Baffle assembly 422 varies from baffle assembly 402 in that conical projections 412 are replaced with straight projections 424. Projections 424 are aligned parallel to edges 404a, 404d and extend from side edge 404b to side edge 404c. In other embodiments, instead of projection welding, individual baffle assemblies may be fixed to the torque converter cover by other types of welding including spot/pinch welding, MIG welding or TIG welding.

Figure 8A:
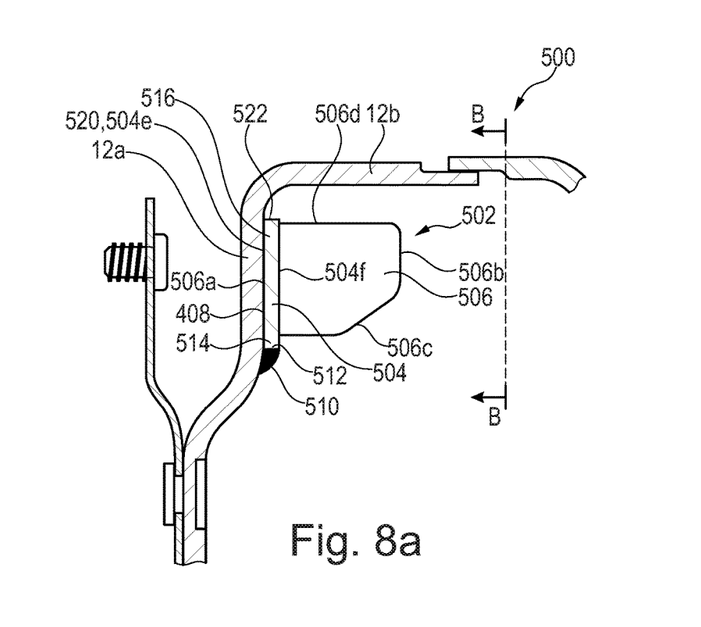
FIGS. 8a to 8e illustrate views of a baffle assembly in accordance with a sixth embodiment of the present invention.
Figure 8B:
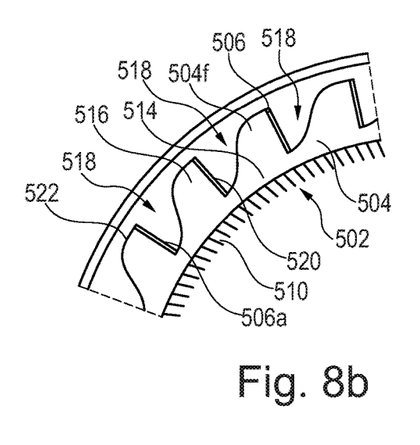

FIG. 8a illustrates a cross-sectional side view of a portion of a torque converter 500 including a baffle assembly 502 in accordance with another embodiment of the present invention. FIG. 8b shows an enlarged perspective view of a section of baffle assembly 502 along B-B in FIG. 8a. Baffle assembly 502 is in the form of a baffle ring and includes an annular base 504 and a plurality of baffles 506 protruding axially from base 504. Base 504 is fixed to axial facing radially extending surface 408 of radially extending plate section 12a of front cover 12 by at least one weld 510. Weld 510 is adhered to an inner circumferential surface 512 of annular base 504 and to radially extending surface 408. A first planar surface 504e is flush against front cover surface 408 and baffles 506 extend from a second planar 504f that is opposite first planar surface 504e. As shown in FIG. 8b, annular base 504 includes a radially inner ring section 514 and a plurality of radially extending protrusions 516 protruding radially outward from ring section 514. Cutouts 518 are provided in between each of protrusions 516 such that cutouts 518 and protrusions 516 are arranged in a circumferentially alternating pattern. Baffles 506 each protrude axially from a respective one of protrusions 516 at a circumferential edge 520 of the respective protrusion 516. Baffles 506 each include a radially extending base side edge 506a that is coincident with circumferential edge 520 of the respective protrusion 516 and an axial facing radially extending free edge 506b that is the portion of baffle 506 that is axially furthest away from front cover surface 408. Baffles 506 also include a radially inner edge 506c and radially outer edge 506d that extend axially from base side edge 506a to free edge 506b. Radially outer edges 522 of protrusions 516 and radially outer edges 506d of baffles 506 form an outermost radial surface of baffle ring 502.

Figure 8C:
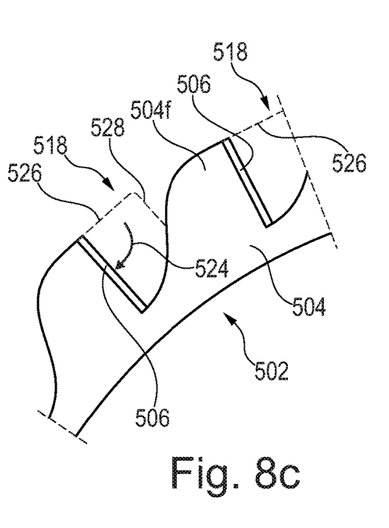

FIG. 8c illustrates the forming of baffle ring 502. Baffle ring 502 is stamped a flat ring with baffles 506 and annular base 504 being in the same plane. After stamping, baffles 506 are bent away from the plane of annular base 504 as shown by an arrow 524 to form cutouts 518, until baffle 506 is perpendicular to annular base 504. Dashed lines 526 represent the outer radial edges 506d of baffles 506 before bending baffle 506 and dashed line 528 represents free edge 506b of baffles before bending.

Figure 8D:
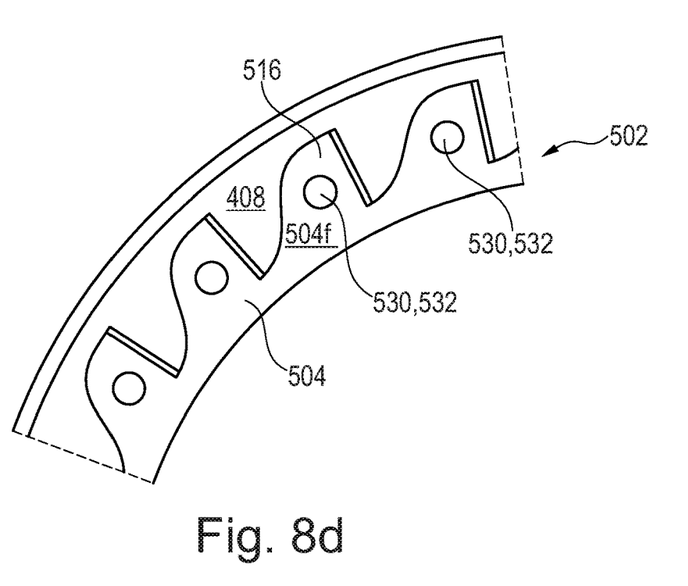

FIG. 8d illustrates baffle ring 502 being fixed to front cover surface 408 by a plurality of rivets 530 instead of by welds. In this embodiment, rivets 530 pass through both of planar surface 504e, 504f and a head 532 of each rivet contracts planar surface 504b.

Figure 8E:
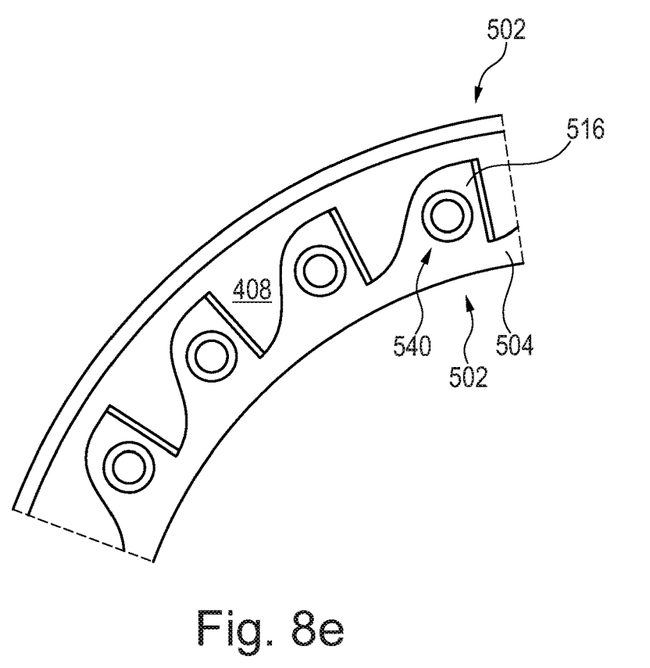

FIG. 8e illustrates baffle ring 502 being fixed to front cover surface 408 by laser welding through annular base 504, instead of by providing welds at the inner circumferential surface of base 504. In this embodiment, laser welds 540 are provided in the center of protrusions 516 to fixed baffle ring 502 to front cover surface 408.

Figure 8F:
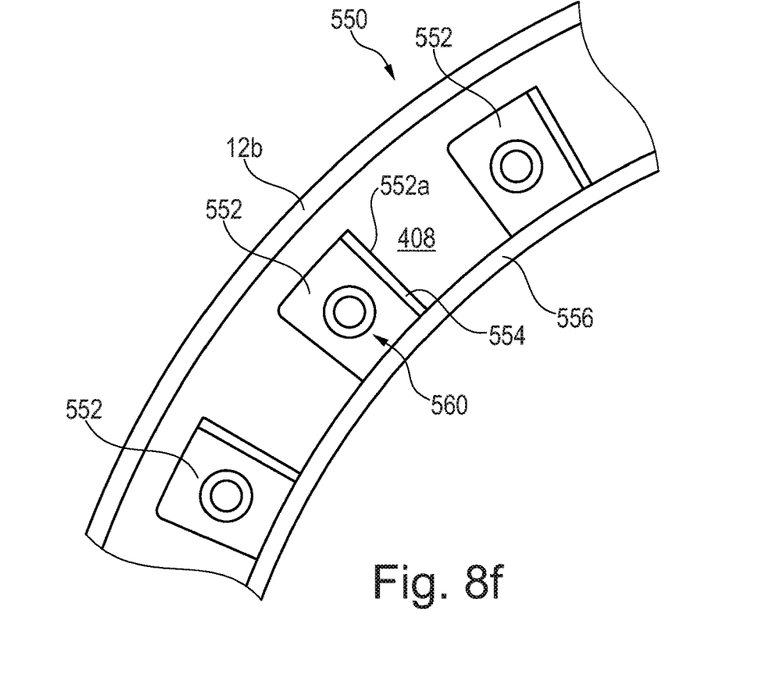
FIGS. 8f and 8g illustrate views of a baffle assembly in accordance with a seventh embodiment of the present invention.
Figure 8G:
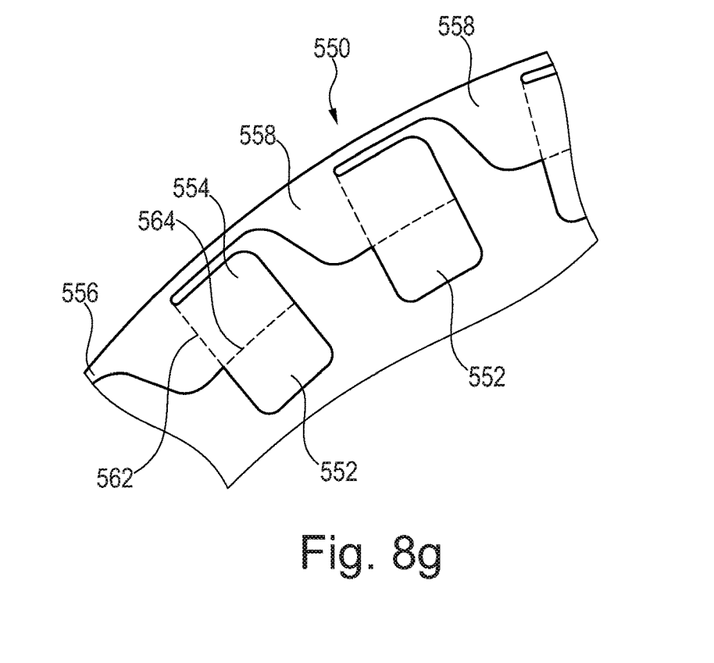

FIGS. 8f and 8g illustrate a baffle ring 550 in accordance with another embodiment of the present invention that may be fixed to front cover surface 408 in place of baffle ring 502. FIG. 8f shows an axial view similar to that shown in FIG. 8b while FIG. 8g shows a plan view of ring 502 before it is bent into the final shape. Instead of fixing a ring to front cover surface 408, baffle ring 550 includes circumferentially spaced connecting sections 552. Connecting sections 552 are fixed flush against front cover surface 408 and an axial protruding baffle 554 extends axially from the respective connecting section 552 at a circumferential edge 552a thereof. An annular base 556 is fixed to baffles 554. Connecting sections 552 may be fixed to front cover surface 408 by a plurality of extruded rivets or laser welds 560. Referring to FIG. 8g, baffle ring 550 may be folded along fold lines 562 to bend connecting sections 552 perpendicular to the plane of annular base 556 and baffles 554 and then along fold lines 564 to bend baffles perpendicular to the plane of annular base 556.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
   a cover, the cover including a radially extending section and an axially extending section extending axially from an outer radial end of the radially extending section;
   a turbine;
   a damper assembly configured for transferring torque from the turbine to a transmission input shaft; and
   at least one baffle assembly attached to the radially extending section or the axially extending section of the cover, the at least one baffle assembly including a plurality of baffles protruding from the cover radially outside of the damper assembly to impact fluid flow in the torque converter.

2. The torque converter as recited in claim 1 wherein the at least one baffle assembly is a baffle ring including an annular base, the plurality of baffles protruding from the annular base.

3. The torque converter as recited in claim 2 wherein the baffles protrude radially outward from the annular base into contact with the axially extending section of the cover.

4. The torque converter as recited in claim 3 wherein the cover includes a plurality of axially extending slots formed in an inner circumferential surface of the axially extending section, at free end of each of the baffles being received in one of the axially extending slots.

5. The torque converter as recited in claim 2 wherein the annular base is fixed into contact with a surface of the cover.

6. The torque converter as recited in claim 5 wherein surface of the cover of the annular base is fixed into contact with is an inner circumferential surface of the axially extending section of the cover.

7. The torque converter as recited in claim 6 wherein the baffles extend radially inward from the annular base.

8. The torque converter as recited in claim 7 wherein the baffles are twisted vanes.

9. The torque converter as recited in claim 5 wherein the surface of the cover the annular base is fixed into contact with is a radially extending surface of the radially extending section of the cover.

10. The torque converter as recited in claim 9 wherein the baffles protrude axially from the annular base.

11. The torque converter as recited in claim 2 wherein the baffle ring includes a plurality of circumferentially spaced connecting sections fixed to the radially extending section of the cover, the baffles protruding axially from the connecting sections into the annular base.

12. The torque converter as recited in claim 1 wherein the at least one baffle assembly includes a plurality of base strips fixed into contact with an inner circumferential surface of the axially extending section of the cover, the baffles protruding radially inward from the base strips.

13. The torque converter as recited in claim 1 wherein the at least one baffle assembly includes a plurality of baffle assemblies, each of the baffle assemblies being projection welded to the cover.

14. A method of forming a torque converter comprising:
providing at least one baffle assembly including a base and a plurality of baffles;
bending the baffles away from the base; and
fixing the at least one baffle assembly to a radially extending section or an axially extending section of a cover.

15. The method as recited in claim 14 wherein the base is annular base.

16. The method as recited in claim 15 wherein the fixing the least one baffle assembly to the radially extending section or the axially extending section of the cover includes providing the baffles in slots in the cover.

17. The method as recited in claim 15 wherein the fixing the least one baffle assembly to the radially extending section of the axially extending section of the cover includes fixing the annular base into contact with a radially extending surface of the radially extending section of the cover.

18. The method as recited in claim 15 wherein the fixing the least one baffle assembly to the radially extending section or the axially extending section of the cover includes fixing the annular base into contact with an inner circumferential surface of the axially extending section of the cover.

19. The method as recited in claim 14 further comprising providing an impeller and a turbine, the turbine including a plurality of blades and an outer radial extension radially outside of the blades configured for frictionally engaging the impeller, the baffle assembly being fixed to the cover in axial alignment with the outer radial extension.

20. A method of forming a torque converter comprising:
providing a turbine and a damper assembly configured for transferring torque from the turbine to a transmission input shaft; and
welding a plurality of L-shaped baffles to a surface of a torque converter cover radially outside of the damper assembly.

* * * * *